US012340343B2

(12) United States Patent  
Dai et al.

(10) Patent No.: US 12,340,343 B2  
(45) Date of Patent: Jun. 24, 2025

(54) SYSTEM FOR MANAGING STORAGE-STATE DATA AND OWNERSHIP CERTIFICATION OF BY-THE-BARREL LIQUOR

(71) Applicant: UNICASK CO., LTD., Tokyo (JP)

(72) Inventors: Youzao Dai, Tokyo (JP); Katsuhiko Tanaka, Tokyo (JP)

(73) Assignee: UNICASK CO., LTD., Tokyo (JP)

( * ) Notice: Subject to any disclaimer, the term of this patent is extended or adjusted under 35 U.S.C. 154(b) by 265 days.

(21) Appl. No.: 18/044,201

(22) PCT Filed: May 21, 2021

(86) PCT No.: PCT/JP2021/019282  
§ 371 (c)(1),  
(2) Date: Mar. 6, 2023

(87) PCT Pub. No.: WO2022/054342  
PCT Pub. Date: Mar. 17, 2022

(65) Prior Publication Data  
US 2023/0325765 A1   Oct. 12, 2023

(30) Foreign Application Priority Data

Sep. 9, 2020   (JP) ................. 2020-150959

(51) Int. Cl.
G06Q 10/087   (2023.01)
H04L 9/00     (2022.01)
H04L 9/30     (2006.01)
H04L 9/32     (2006.01)

(52) U.S. Cl.  
CPC ............. *G06Q 10/087* (2013.01); *H04L 9/30* (2013.01); *H04L 9/3213* (2013.01); *H04L 9/50* (2022.05)

(58) Field of Classification Search  
CPC .............. G06Q 10/087; G06Q 30/018; G06Q 2220/00; G06Q 40/04; G06Q 10/08;  
(Continued)

(56) References Cited

U.S. PATENT DOCUMENTS 8,571,690 B2 * 10/2013 Bartee .................... C12M 41/46  
703/11

FOREIGN PATENT DOCUMENTS

CN   110689251 A   *   1/2020   ......... G06F 16/2457  
CN   110827042 A   *   2/2020  
(Continued)

OTHER PUBLICATIONS

"Buying Whiskey by the Barrel! The Joy of Buying Like a Connoisseur", (Tanoshiiosake.JP), https://tanoshiiosake.p/3766, updated Dec. 27, 2018, accessed Mar. 6, 2023 (4 pages).

(Continued)

*Primary Examiner* — Russell S Glass  
(74) *Attorney, Agent, or Firm* — Law Office of Katsuhiro Arai

(57) ABSTRACT

A system for managing storage-state data of by-the-barrel liquor includes barrels to be filled with an unblended liquor, GPS sensors and IoT sensors installed on the barrels, and a server along with a processing program thereof, wherein the processing program: issues a unique barrel number for each individual barrel while recording on the server its basic data including the distillery name, brand, and unblended liquor fill date; obtains and records on the server the location information transmitted by the GPS sensor linked to the barrel number, and the storage-state data of the individual barrel transmitted by the IoT sensor linked to the barrel number, including the time elapsed from the unblended liquor fill date, and temperature and humidity taken at each specified time interval; hashes the basic data, location infor- (Continued)

mation, and storage-state data by linking the barrel number thereto, and records the result on a public blockchain.

14 Claims, 5 Drawing Sheets

(58) Field of Classification Search
CPC ......... G06Q 50/04; H04L 9/30; H04L 9/3213; H04L 9/50; H04L 9/3263; Y02P 90/30
USPC .......................................................... 705/28
See application file for complete search history.

(56) References Cited

FOREIGN PATENT DOCUMENTS

| CN | 111047333 | A | * | 4/2020 | ......... G06F 21/6227 |
|---|---|---|---|---|---|
| CN | 111160931 | A | * | 5/2020 | |
| CN | 109345264 | B | * | 8/2021 | ......... G06Q 20/3825 |
| JP | 2019198251 | A | | 11/2019 | |

OTHER PUBLICATIONS

"The Ultimate Connoisseur Buying Guide! Can I Buy One Entire Barrel of Whiskey?", (LOOHCS—Social Media Platform for Items of Fine Taste and Quality We Can Talk about Tomorrow), https://loohcs.jp/articles/2829, updated Jul. 24, 2019, archived Jul. 24, 2021, Wayback Machine, https://web.archive.org/web/2023000000000*/https://loohcs.jp/articles/2829 (18 pages).

International Search Report (ISR) mailed Oct. 19, 2021, issued for International application No. PCT/JP2021/019282. (2 pages).

* cited by examiner

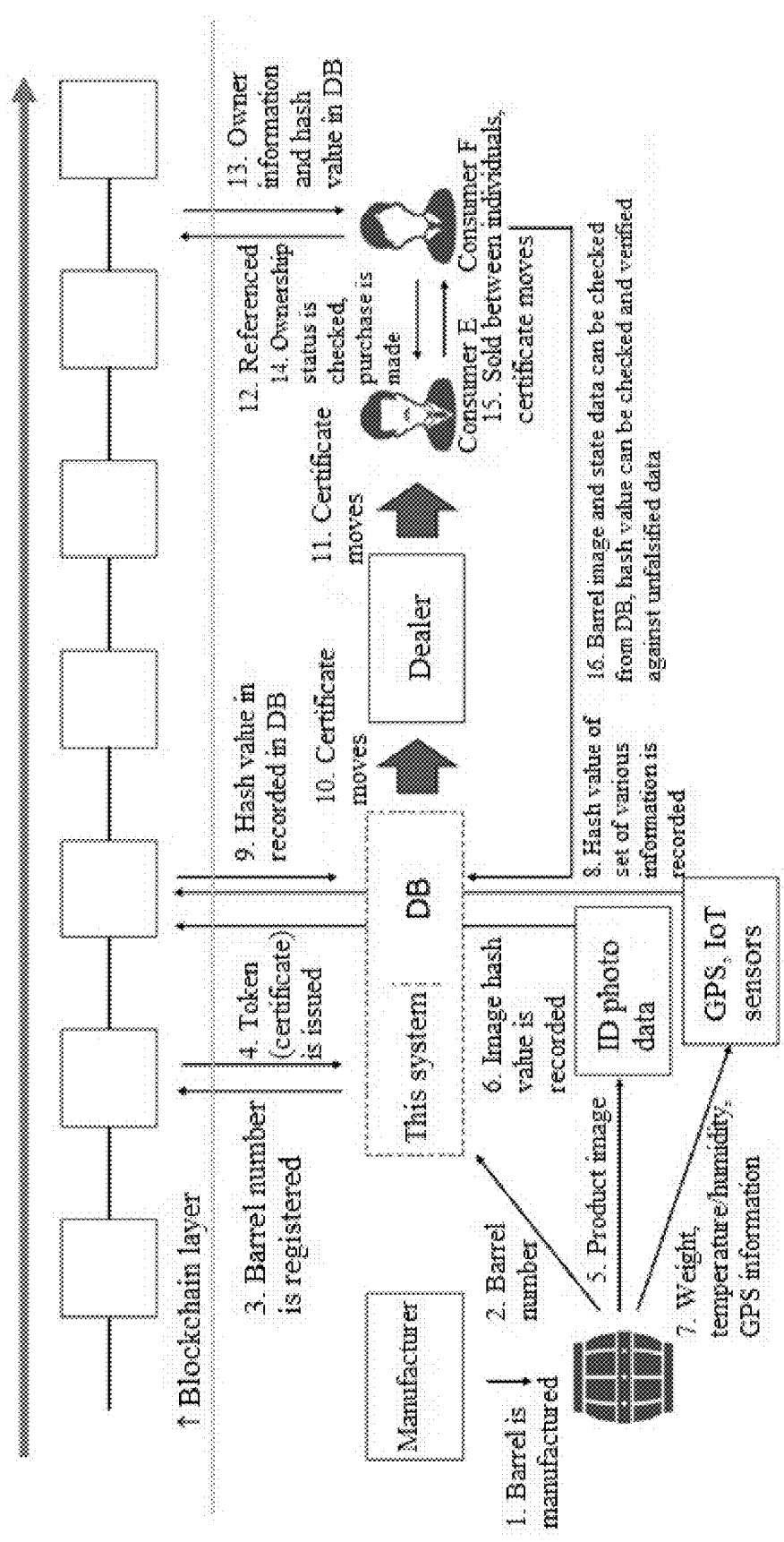

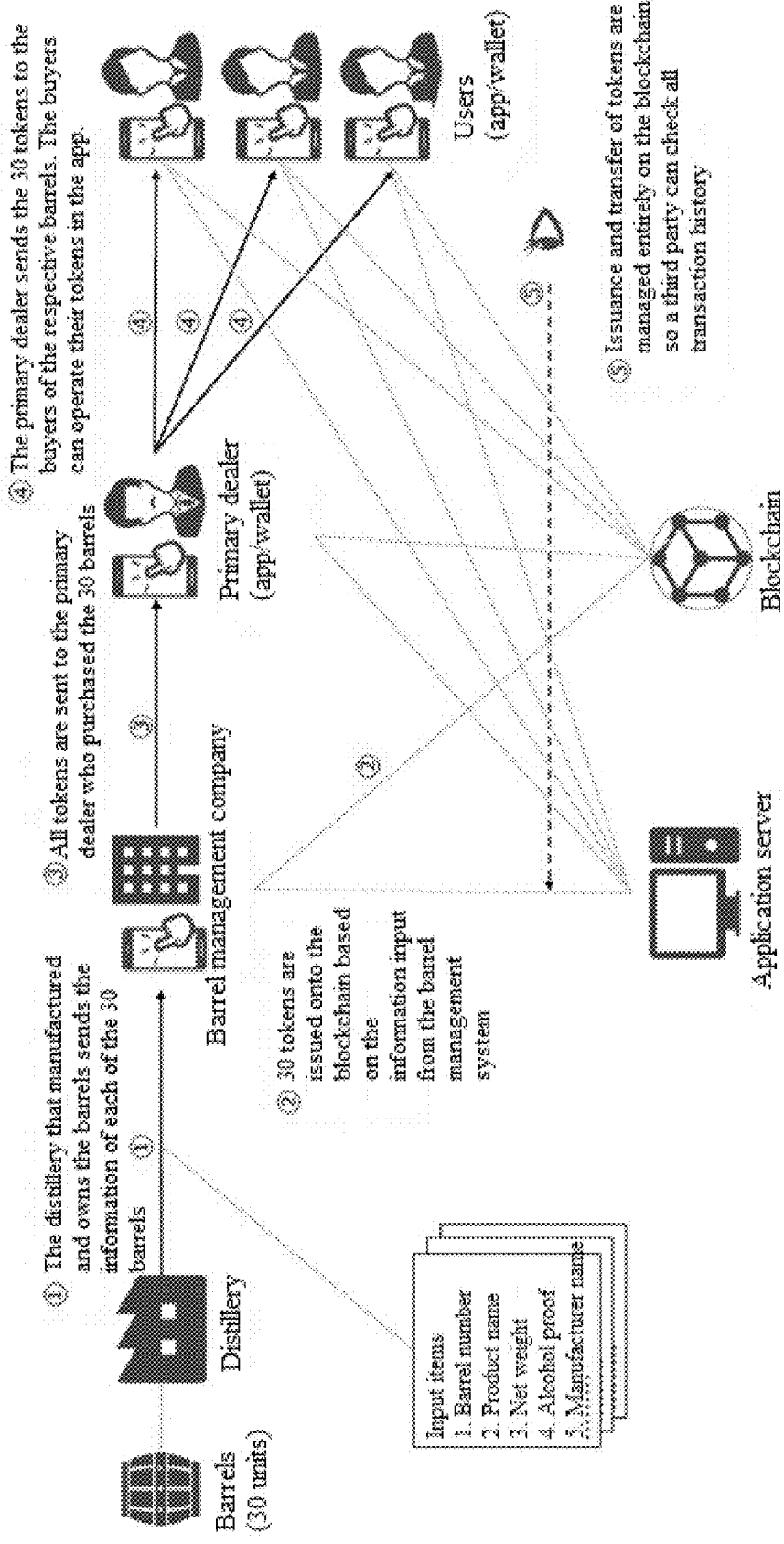

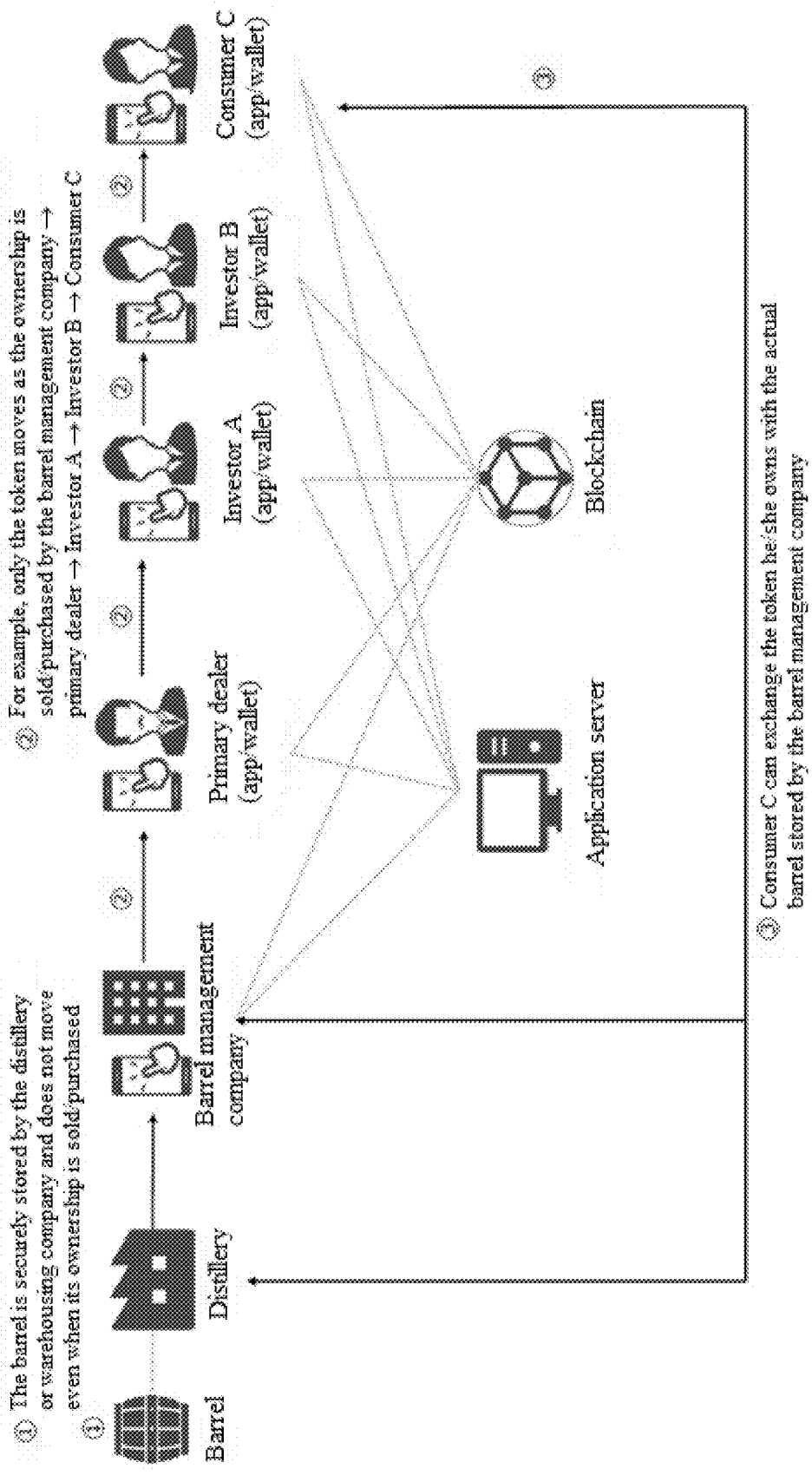

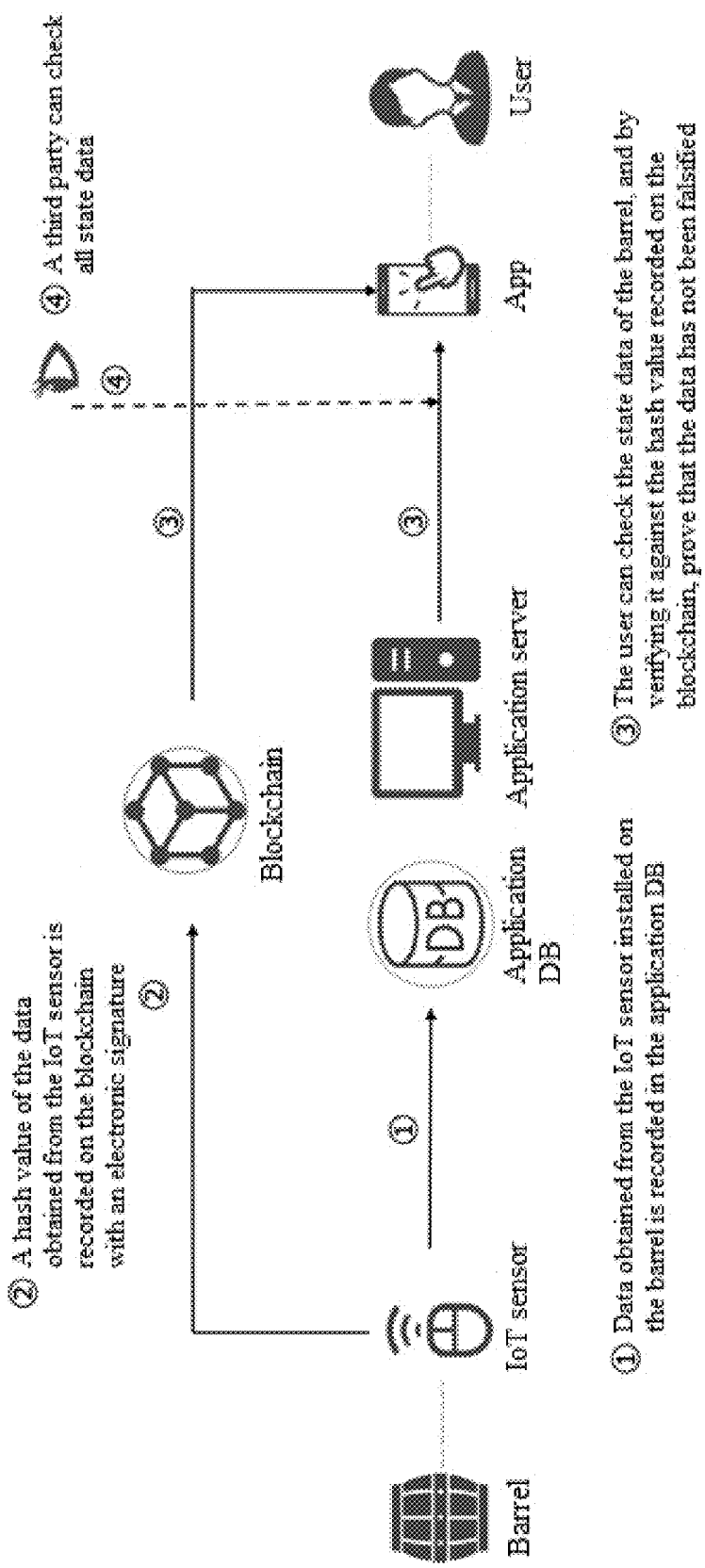

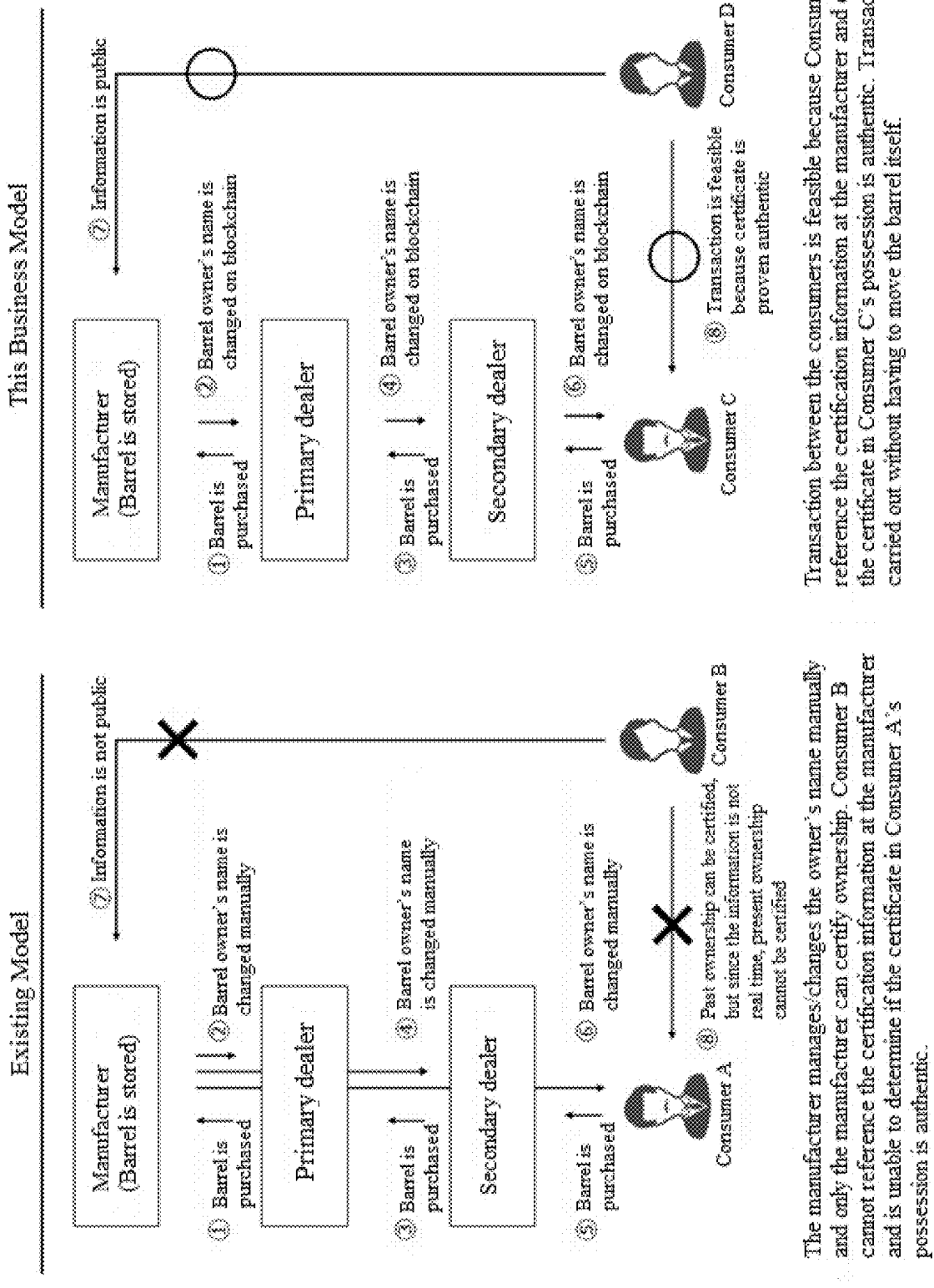

SYSTEM FOR MANAGING STORAGE-STATE DATA AND OWNERSHIP CERTIFICATION OF BY-THE-BARREL LIQUOR

CROSS-REFERENCE TO RELATED APPLICATIONS

This application is the U.S. National Phase under 35 U.S.C. § 371 of International Application PCT/JP2021/019282, filed May 21, 2021, which claims priority to Japanese Patent Application No. JP2020-150959, filed Sep. 9, 2020. The International Application was published under PCT Article 21 (2) in a language other than English.

TECHNICAL FIELD

The present invention relates to a system for managing storage-state data and ownership certification of barrels containing whiskey and other liquors that are traded by the barrel.

BACKGROUND ART

Generally, with liquors such as whiskey that are aged and stored in barrels, an unblended liquor is barreled at the liquor manufacturer's distillery and then aged for a specific period, after which the liquor is blended and bottled for subsequent distribution to the market. In the meantime, some manufacturers (distilleries) are selling barreled liquors by the barrel directly to collectors and liquor drinkers or selling them by the barrel to brokers who facilitate transactions between collectors/liquor drinkers and distilleries, and this business is growing on a global scale (refer to Non-patent Literature 1 and Non-patent Literature 2).

In places like Scotland, for example, transactions are carried out wherein the barrels under aging do not themselves physically move but only ownership of the barrels is transferred, with title transfers handled by paper contracts at the distilleries or warehouses where the barrels are aged and stored.

Currently, distilleries are managing their barrels primarily with ledger-based paper files or internal management systems. Also, because the ledger can be managed, edited, and viewed only at the storage facility where the barrels are stored, the end-user such as a collector or liquor drinker is unable to confirm the authenticity of the management information with the broker, and thus has no means for grasping, with certainty, whether or not human errors have been made through manual ledger entry and editing, or whether or not the data has been falsified by a malicious broker, etc.

In other words, the collector, liquor drinker, and broker have no way of knowing of clerical errors, should they occur, in the ledger managed at a distillery, and even with data accurately managed by the distillery, when the data is passed on to a broker, errors can still occur during the course of its management by the broker, or a malicious broker, etc., may falsify the data. Particularly with whiskey, etc., whose value is greatly influenced by the distillery name, brand, storage state, and years aged, inaccurate information or data falsification will cause significant economic losses to the collector or liquor drinker being the end-user.

The most egregious act that can be committed with a paper transfer contract as currently used, is fraud whereby the broker presents (through a fake contract) and sells a fake barrel ownership to the user. Under the current paper-dependent system, such egregious acts of forgery/fraud cannot be eliminated. Furthermore, paper-based management precludes real-time certification of ownership in that even if one is in possession of an authentic paper certificate, it only certifies his/her past ownership, and this inability to certify present ownership facilitates acts of fraud.

As a result, the current system limits the buying and selling of liquor barrels to transacting with trusted counterparties in the form of buying and selling from/to counterparties one has a trust relationship with, or using a limited buying/selling model through large auction houses with high credibility.

The business of buying and selling by the barrel is growing each year, with one barrel of the "Yamazaki 50 Years Old" whiskey by Suntory Spirits Limited commanding a winning bid of approx. 32.5 million yen at the Sotheby's Auction held in Hong Kong in January 2018, and therefore development of a liquor barrel trading market or marketplace that ensures reliability and security, is highly fluid, and encompasses a wide range of products, is desired.

BACKGROUND ART LITERATURE

Non-Patent Literature

Non-patent Literature 1: "Buying Whiskey by the Barrel! The Joy of Buying Like a Connoisseur" (Tanoshiiosake. JP) https://tanoshiiosake.jp/3766

Non-patent Literature 2: "The Ultimate Connoisseur Buying Guide! Can I Buy One Entire Barrel of Whiskey?" (LOOHCS—Social Media Platform for Items of Fine Taste and Quality We Can Talk about Tomorrow) https://loohcs.jp/articles/2829

SUMMARY OF THE INVENTION

Problems to be Solved by the Invention

As described above, under the conventional management method and buying/selling method the end-user has no choice but to trust the information generated manually by the distillery and broker, and since there is no way of certifying the authenticity of the information, everything relies on a "trust relationship."

Furthermore, the manual management method using paper ledgers makes long-term storage management difficult as it involves risks of not only erroneous entry and falsification of information but also loss, theft, etc. The same goes with electronic systems built in-house.

An object of the present invention is to utilize blockchain technology, GPS, and IoT to manage ownership transfers pertaining to liquor barrels under aging, as well as various data relating to the managed status of the liquor barrels, such as temperature, humidity, and various other data on the liquor barrels that affect the taste and aroma, so as to add value to the liquor barrels as commodities, guarantee their authenticity/credibility in the global trading environment, and facilitate a healthy growth of, and stimulate, the liquor barrel trading marketplace.

Means for Solving the Problems

To achieve the aforementioned object, a first invention under the current application for patent is a system for managing storage-state data of by-the-barrel liquor using blockchain, which is characterized by including barrels to be filled with an unblended liquor, GPS sensors and IoT sensors installed on the barrels, and a server for managing the system along with a processing program thereof, wherein the processing program:

records on the server the basic data of each of the barrels including its unique barrel number as well as the distillery name, brand, and unblended liquor fill date linked thereto;

picks up and records on the server the location information transmitted by the GPS sensor linked to the barrel number, and the storage-state data of the individual barrel transmitted by the IoT sensor linked to the barrel number, including the time elapsed from the unblended liquor fill date, and temperature and humidity taken at each specified time; and hashes the basic data, location information, and storage-state data by linking the barrel number thereto, and records the result on a public blockchain.

Furthermore, to achieve the aforementioned object, a second invention under the current application for patent is a system for managing storage-state data and certifying ownership of by-the-barrel liquor using blockchain, which is characterized by including barrels to be filled with an unblended liquor, GPS sensors and IoT sensors installed on the barrels, and a server for managing the system along with a processing program thereof, wherein the processing program:

records on the server the basic data of each of the barrels including its unique barrel number as well as the distillery name, brand, and unblended liquor fill date linked thereto;

picks up and records on the server the location information transmitted by the GPS sensor linked to the barrel number, and the storage-state data of the individual barrel transmitted by the IoT sensor linked to the barrel number, including the time elapsed from the unblended liquor fill date, and temperature and humidity taken at each specified time;

hashes the basic data, location information, and storage-state data by linking the barrel number thereto, and records the result on a public blockchain; and records on the blockchain a certificate token linked to the barrel number.

Effects of the Invention

According to the system pertaining to the first invention under the present application for patent, blockchain technology as well as GPS and IoT sensors are used to detect the stored state of a barrel of whiskey, etc., in which an unblended liquor is filled and stored, thereby allowing the true information free of forgery and errors (for example, information such as which brand of liquor was filled, when, in what kind of barrel, at which distillery, of which manufacturer, etc., as well as management data such as temperature, humidity, years aged, etc.) to be detected in real time, and as a result, the broker and end-user can evaluate the unblended-liquor-filled barrel instantly and accurately with peace of mind.

By utilizing this system to obtain temperature, humidity and other data influencing the state of aging that determines the taste, aroma, flavor, etc., relating to the quality of a liquor barrel, and link the data to the liquor barrel as true information, an added value can be created which is the ability to certify that the product is in a properly aged state.

By utilizing this system to eliminate information/data falsifications and recording errors, the manufacturer and broker can impart trust and credibility to other brokers or end-users with whom they have no traditional, special relationship.

Furthermore, barrel management at the distillery is automated by utilizing GPS and IoT sensors, which allows for reduction of manual workload.

Also, according to the system pertaining to the second invention under the present application for patent, the broker and end-user can, in addition to enjoying the features provided by the first invention, obtain true ownership information (account ownership) in real time in the form of a certificate token, and this permits easy, uninterrupted transactions because, even if the company owning or storing a barrel becomes insolvent or goes bankrupt, its ownership can be certified by referencing the on-blockchain data.

Furthermore, the system pertaining to the present invention can connect manufacturers, brokers. and end-users around the world via the Internet environment so that, for example, a barrel can be transferred reliably to a different owner's name regardless of his/her nationality and with the barrel still remaining in storage at the distillery, which, as a result, allows for healthy growth and stimulation of the liquor barrel trading marketplace on a global scale.

Furthermore, when the system pertaining to the present invention is utilized, structurally the transactions of liquor barrels must be carried out within the blockchain system, which means that any buying and selling outside the blockchain can be prevented entirely. Additionally, all transactions involving certificate transfer on secondary and subsequent markets will also be carried out within the blockchain-based system, and since the present invention certifies barrel ownership using on-blockchain tokens, it becomes possible, for example, to distribute a certain amount of money every time a barrel changes hands from the manufacturer to the primary broker, secondary broker, and so on.

BRIEF DESCRIPTION OF THE DRAWINGS

FIG. 1 A diagram showing an overview of the entire model of the present invention FIG. 2 A system configuration diagram of token issuance (Issuing tokens for 30 barrels)

FIG. 3 A diagram showing buying/selling of ownership of liquor by the barrel, and delivery of the physical barrel, using a token FIG. 4 A system diagram of sensor data recording FIG. 5 A diagram comparing conventional technology and after the present invention is implemented

MODE FOR CARRYING OUT THE INVENTION

Embodiments of the present invention are explained in detail below. It should be noted that the embodiments explained below are exemplifications for explaining the present invention and not intended to limit the present invention to these embodiments, and various modifications can be made to the present invention to the extent that doing so does not deviate from the key points thereof.

Embodiments of the present invention as applied to the business of buying and selling whiskey barrels, are explained in detail based on FIGS. 1 to 5.

FIG. 1 is a diagram that schematically illustrates an overall flow of the present invention, explaining filling of an unblended liquor in a liquor barrel, issuance of a certificate token (NFT=non-fungible token, token that cannot be replaced) linked to the barrel, method for recording environmental data, referencing of ownership information, movement of the certificate, etc.

First, the whiskey manufacturer manufactures an unblended liquor according to the normal procedure, fills the unblended liquor in a barrel (1), transports the barrel to a storage warehouse, and ages it for a specified period of time. Here, the system (processing program) pertaining to the present invention issues a barrel number being a serial number constituted by a truly-random number unique to each barrel (2), and issues onto a blockchain an NFT linked to the barrel number (3, 4). It should be noted that the barrel number may be one defined by the manufacturer itself as a truly-random serial number based on the manufacturer's own standard.

Furthermore, an image of the barrel (ideally an image that physically displays the barrel number) captured by a user of the system is uploaded to the system as an ID photo (5), and the hash value of the image is recorded on the blockchain through the system (6). This way, the barrel number is accurately recorded to prevent discrepancy between the barrel number recorded on the certificate token and the actual barrel number, or any modification or falsification of the record.

Also, a GPS sensor and an IoT sensor, each linked to the system, are installed on the barrel to obtain location information, barrel weight, temperature, humidity, and other information to be recorded in the database at specified intervals (7, 8). Data obtained from the GPS sensor and IoT sensor are recorded on the blockchain as individual data or a hash value of the entire data (9) so that any fraudulent use or falsification of the name and location of the distillery, or state data during the aging period of the barrel, can be prevented.

The certificate token, which is treated as a certificate, is moved by the system from the manufacturer to the broker (dealer), and from the broker to a consumer, every time the barrel is sold and purchased (10, 11). Consumer F who wishes to purchase the barrel from Consumer E can do so with peace of mind because whether or not Consumer E is the true owner of the barrel can be confirmed on the blockchain layer (12, 13, 14, 15). Furthermore, the distillery location information as well as state data such as weight, temperature, and humidity can be checked at any time with respect to the barrel in question (16), which means that its managed state, beginning with the filling of the unblended liquor and throughout the aging period, can also be detected as true information.

FIG. 2 is a system diagram that schematically illustrates how certificate tokens are issued and how these certificate tokens are transferred. The example in FIG. 2 explains a scenario where the distillery that barrels an unblended liquor and stores the barrels applies the system to 30 barrels for which it wishes to issue a certificate.

It is shown that the distillery informs the company managing this system (1) of the basic information of each barrel, including the barrel number, unblended liquor fill date, brand, net weight, alcohol proof, and manufacturer name; however, the distillery may directly enter each of the above information in the system. The system issues certificate tokens onto the blockchain based on this information. These certificate tokens are NFTs (non-fungible tokens, tokens that cannot be replaced) in that each individual token holds uniquely different data and is thus identifiable. The NFTs issued by this system are linked to the respective barrel numbers, and these certificate tokens themselves can certify the ownership of the barrels.

The owner of a certificate token can at any time exercise his/her right and exchange the certificate token for the barrel (except that there may be a minimum aging period depending on the brand). The management company issues different certificate tokens for the different barrels, respectively, onto the blockchain (2).

In the example explained in FIG. 2, all 30 barrels are purchased from the manufacturer by the broker, and the certificate tokens for the 30 barrels that have been issued by the system are sent from the management company to the broker (3), thereby transferring the ownership of all 30 barrels from the manufacturer to the broker.

Thereafter, the broker sells each barrel to an individual user (or secondary broker, etc.), and upon conclusion of the applicable sales contract, the certificate token for the barrel sold is transferred to each individual (or secondary broker, etc.) to whom the barrel was sold (4). It should be noted that, structurally, this movement and ownership of certificate tokens is managed on both the system's application server and the blockchain so that a third party can confirm the applicable transaction history and ownership status at any time (5).

FIG. 3 is a system diagram showing the flow of a certificate token certifying the ownership of a barrel as the barrel is sold and purchased, and how the token is exchanged with the physical barrel. After being filled with an unblended liquor, the barrel is stored at the distillery (or other warehouse), and even when its ownership is transferred, the barrel generally does not move (1), and instead, only the ownership of the certificate token on the blockchain is transferred (2) and the unblended liquor filled in the barrel continues to be aged at the distillery (or other warehouse), and only when the time comes for the token to be actually exchanged for the barrel, the stored barrel is shipped or the unblended liquor in the barrel is bottled and exchanged (3).

Transaction history of the aforementioned buying and selling of by-the-barrel ownership using the certificate token is recorded on both the application server and the blockchain so that, even if an attempt is made by the application server to falsify a record, the hash value of the falsified record does not match the hash value on the blockchain, and therefore the falsification can be detected with ease.

Furthermore, the transaction history and ownership status can be checked by a third party at any time on the blockchain, so that a party wishing to trade the certificate token can confirm the fact that the other party actually owns the barrel. Once the certificate token reaches the end-user (Consumer C) who then decides to exercise the right granted to him/her by the certificate token and make an exchange, the barrel management company can verify whether Consumer C does own the certificate token, making the confirmation easy and quick without having to fill out, generate, submit, or otherwise handle any special documents.

For each of Investor A, Investor B, Consumer C, etc., in FIG. 3, a hash value of personal authentication documents is recorded in his/her blockchain account using a smart contract. By utilizing this hash value, ownership by each individual can be certified by verifying it against the hash value recorded on the blockchain, and by, if necessary, submitting the individual's personal data, without openly disclosing the individual's personal information, protecting the individual's privacy.

In FIG. 3, the private/public-key encoding method, which can be employed in a manner ensuring privacy protection, is utilized to check whether the statement that the other party owns the certificate token is true or false in a transaction. Investor A has a private key and a public key, and Investor B obtains the public key from the blockchain of the account that owns the certificate token. To check if Investor A actually owns the certificate token, Investor B uses the public key to decode the specified message encoded by Investor A using the private key, thereby certifying that Investor A is the owner of the certificate to the barrel. Here, what is encoded does not matter because all that is needed is to correctly decode the encoded content and match it to the original text of the specified message.

In FIG. 3, as a way of verifying that the registered information of the seller is true or false when entering into a by-the-barrel sales contract, the hash value reference method can be used. This technology allows Investor B, or the buyer who requested personal or corporate registration information from Investor A, to verify that Investor A has not submitted false information. To be specific, the hash value of Investor A's information registered in the system is compared with the hash value of the information submitted by Investor A to Investor B, and while a perfect match means the information is not false, any discrepancy can easily reveal that the information is false or inadequate.

FIG. 4 is a system diagram of recording the data obtained from GPS and IoT sensors. GPS and IoT sensors are installed on each of the barrels stored at the distillery (or warehouse), and the system automatically records in the application database the data transmitted by the GPS and IoT sensors at specified intervals (such as every month, week, day, or hour) (1), while at the same time recording their hash value on the blockchain (2).

In the user's app, the hash values in the application database and on the application server can be verified against the hash values recorded on the blockchain (3). This hash value, which is a numeric value obtained by hashing data, has a characteristic of changing when the original unhashed data is modified, added to, falsified, etc., and therefore by verifying the hash values recorded in the application database and on the application server against the hash values on the blockchain, any falsification, deletion or other fraudulent act committed on the recorded information can be detected, allowing any third party to verify the authenticity of the information (4).

FIG. 5 is a diagram comparing the existing model for barrel selling and the model made possible by the present invention. Under the conventional model, the manufacturer manually records the barrel management information and anyone who wishes to purchase liquor by the barrel has no choice but to purchase it from the manufacturer who must be trusted, or from a trusted broker; according to the present invention, by contrast, a blockchain-based system is utilized to allow even parties not knowing each other to carry out a secure transaction in a swift manner because everything is based on true information.

Under the present invention, blockchain is utilized to partially publish owner information relating to a given barrel so that anyone can check if the transacting party actually owns the barrel, when the barrel was filled with the unblended liquor, at which distillery, how many years it has been aged in what kind of environment, how it has come to be in the possession of the current owner, and so on.

What is claimed:

1. A system for managing storage-state data and certifying ownership of by-the-barrel liquor using a public blockchain, characterized by including:

barrels to be filled with an unblended liquor,

GPS sensors and IoT sensors installed on the barrels, a server for managing the system along with a processing program thereof, which is program code recorded on a non-transitory computer-readable medium which is connected to the server, and an application/wallet provider configured to connect to the server over the Internet, wherein the server is configured to receive data transmitted by each GPS sensor and each IoT sensor, operate the processing program, and connect to the public blockchain over the Internet, wherein the processing program:

records on the server, basic data of each of the barrels including a distillery name, brand, and unblended liquor fill date, which are linked to a unique barrel number assigned to each barrel;

obtains and records on the server, location information transmitted by the GPS sensor linked to the barrel number, and storage-state data of each barrel transmitted by the IoT sensor linked to the barrel number, including time elapsed from the unblended liquor fill date, and temperature and humidity taken at each specified time interval;

hashes the basic data, location information, and storage-state data by linking each barrel number thereto, and records a result on the public blockchain; and records on the public blockchain, a certificate token linked to each barrel number, wherein the application/wallet provider is configured to receive all certificate tokens from the server and to provide a buyer with a certificate token of a barrel of the buyer's interest who accesses the public blockchain, as a purchase process, to obtain storage-state data and ownership data associated with the barrel number linked to the certificate token.

2. The system for managing storage-state data and certifying ownership of by-the-barrel liquor according to claim 1, characterized in that the certificate token is a non-fungible token (NFT).

3. The system for managing storage-state data and certifying ownership of by-the-barrel liquor according to claim 1, characterized in that the barrel number is a serial number, which is constituted by a truly-random number issued by a manufacturer based on its own standard before the unblended liquor was filled in the barrel, or a truly-random number automatically generated by the processing program.

4. The system for managing storage-state data and certifying ownership of by-the-barrel liquor according to claim 1, characterized in that the basic data further includes an image of each barrel.

5. The system for managing storage-state data and certifying ownership of by-the-barrel liquor according to claim 1, characterized in that the certificate token is managed by an on-blockchain account protected by an encoding method of a private key and a public key which are usable while ensuring privacy protection.

6. The system for managing storage-state data and certifying ownership of by-the-barrel liquor according to claim 1, characterized in that, upon conclusion of a sales contract of the barrel, the processing program hashes registered information of a buyer and records a result on the blockchain.

7. A method for managing storage-state data of by-the-barrel liquor using a public blockchain, comprising steps of:

(i) providing or offering barrels to be filled with an unblended liquor, GPS sensors and IoT sensors installed on the barrels, a server and a processing program for managing storage-state data of by-the-barrel liquor, and an application/wallet provider configured to connect to the server over the Internet, wherein the processing program is program code recorded on a non-transitory computer-readable medium which is connected to the server, and the server is configured to receive data transmitted by each GPS sensor and each IoT sensor, operate the processing program, and connect to the public blockchain over the Internet;

(ii) recording on the server, basic data of each of the barrels, including a distillery name, brand, and unblended liquor fill date, which are linked to a unique barrel number assigned to each barrel;

(iii) obtaining and recording on the server, location information transmitted by the GPS sensor linked to the barrel number, and storage-state data of each barrel transmitted by the IoT sensor linked to the barrel number, including a time elapsed from the unblended liquor fill date, and a temperature and humidity taken at each specified time interval;

(iv) hashing the basic data, location information, and storage-state data by linking the barrel number thereto, and recording a result on the public blockchain; (v) recording on the public blockchain, a certificate token linked to each barrel number; and (vi) allowing the application/wallet provider to connect to the server over the Internet, to receive all certificate tokens from the server, and to provide a buyer with a certificate token of a barrel of the buyer's interest who accesses the public blockchain, as a purchase process, to obtain storage-state data and ownership data associated with the barrel number linked to the certificate token, thereby carrying out a secure transaction.

8. The method according to claim 7, wherein the barrel number is a serial number, which is constituted by a truly-random number issued by a manufacturer based on its own standard before the unblended liquor was filled in the barrel, or a truly-random number automatically generated by the processing program.

9. The method according to claim 8, wherein the basic data further includes an image of each barrel.

10. The method according to claim 7, wherein the certificate token is a non-fungible token (NFT).

11. The method according to claim 7, wherein the barrel number is a serial number, which is constituted by a truly-random number issued by a manufacturer based on its own standard before the unblended liquor was filled in the barrel, or a truly-random number automatically generated by the processing program.

12. The method according to claim 7, wherein the basic data further includes an image of each barrel.

13. The method according to claim 7, wherein the certificate token is managed by an on-blockchain account protected by an encoding method of a private key and a public key which are usable while ensuring privacy protection.

14. The method according to claim 7, wherein, in step (vi), upon conclusion of a sales contract of the barrel, the processing program hashes registered information of a buyer and records a result on the blockchain.

* * * * *